United States Patent
Gheyri

(10) Patent No.: US 10,921,006 B2
(45) Date of Patent: Feb. 16, 2021

(54) GREEN HVAC FOR COMMERCIAL BUILDINGS/WAREHOUSES/MULTI LEVEL RESIDENTIALS

(71) Applicant: Cyrous Gheyri, Cupertino, CA (US)

(72) Inventor: Cyrous Gheyri, Cupertino, CA (US)

( * ) Notice: Subject to any disclaimer, the term of this patent is extended or adjusted under 35 U.S.C. 154(b) by 179 days.

(21) Appl. No.: 15/360,978

(22) Filed: Nov. 23, 2016

(65) Prior Publication Data
US 2017/0146254 A1    May 25, 2017

Related U.S. Application Data

(60) Provisional application No. 62/386,199, filed on Nov. 23, 2015.

(51) Int. Cl.
| | | |
|---|---|---|
| *F24F 7/08* | (2006.01) | |
| *F24F 7/02* | (2006.01) | |
| *F24F 11/30* | (2018.01) | |
| *F24F 11/77* | (2018.01) | |
| *F24F 110/10* | (2018.01) | |

(52) U.S. Cl.
CPC ............... *F24F 7/08* (2013.01); *F24F 7/025* (2013.01); *F24F 11/30* (2018.01); *F24F 11/77* (2018.01); *F24F 2110/10* (2018.01); *Y02B 30/70* (2013.01)

(58) Field of Classification Search
CPC .... F24F 7/08; F24F 7/025; F24F 11/77; F24F 11/30; F24F 2110/10; Y02B 30/746
USPC .......................... 454/229, 231, 232, 234, 235
See application file for complete search history.

(56) References Cited

U.S. PATENT DOCUMENTS

| | | | | | |
|---|---|---|---|---|---|
| 1,921,900 | A | * | 8/1933 | Wood | A01K 31/16 454/234 |
| 3,347,025 | A | * | 10/1967 | Wiley | F24F 3/1603 422/121 |
| 3,363,531 | A | * | 1/1968 | Kohlmeyer | A01K 1/0052 454/234 |
| 3,367,258 | A | * | 2/1968 | Erfeling | A01K 1/0047 454/234 |
| 3,831,669 | A | * | 8/1974 | Menne | F24F 1/00 165/122 |
| 3,884,133 | A | * | 5/1975 | Miller | A62C 2/06 165/250 |
| 3,973,479 | A | * | 8/1976 | Whiteley | F24F 7/065 454/231 |
| 4,136,606 | A | * | 1/1979 | Wolbrink | F24F 7/065 454/231 |
| 4,362,090 | A | * | 12/1982 | Whiteley | F24F 3/16 126/113 |
| 4,945,820 | A | * | 8/1990 | Fukuda | F24F 7/065 454/231 |
| 5,941,767 | A | * | 8/1999 | Fukuda | F24F 7/065 454/230 |
| 6,241,600 | B1 | * | 6/2001 | Uehara | F24F 7/013 454/235 |

(Continued)

*Primary Examiner* — Edelmira Bosques
*Assistant Examiner* — Dana K Tighe

(57) ABSTRACT

A green HVAC system for single or multi level commercial or residential buildings including:
a building having a lower elevation and higher elevation.
 (i) The lower elevation blower that can blow air to higher elevation or outside of building, or can suck air from higher elevation or outside of building
 (ii) The higher elevation blower that can blow air to lower elevation or outside of building, or can suck air from lower elevation or outside of building.

8 Claims, 4 Drawing Sheets

(56) References Cited

U.S. PATENT DOCUMENTS

| | | | |
|---|---|---|---|
| 8,123,142 B2* | 2/2012 | Cislo | F24F 7/06 236/49.3 |
| 8,688,278 B2* | 4/2014 | Kreft | F24F 3/044 700/276 |
| 2006/0099904 A1* | 5/2006 | Belt | F24F 7/06 454/236 |
| 2007/0149107 A1* | 6/2007 | Choi | F21V 33/0088 454/229 |

* cited by examiner

GREEN HVAC FOR COMMERCIAL BUILDINGS/WAREHOUSES/MULTI LEVEL RESIDENTIALS

TECHNICAL FIELD

The present invention relates to green system for heating and cooling for buildings, and to building green heating and cooling systems that reduce energy usage.

SUMMARY OF THE INVENTION

The present invention provides a green system for heating and cooling for single or multi level building also can achieve thermal equilibrium between higher and lower elevation or multi level buildings. Higher elevation in any building has higher temperature than lower elevation based on the fact that hot air rises.

For heating, both higher and lower elevation air blower system can interact with outside air for rising temperature if outside temperature is higher than lower and higher elevation temperatures. Then in this case both higher and lower elevation air is replaced by outside air. If lower elevation temperature is only lower than outside temperature then lower elevation interact with outside temperature to replace lower elevation air with outside air. If both higher elevation and lower elevation temperature are higher than outside temperature, then there are no interaction with outside air. After the outside air exchange if any is done, then higher elevation air can be brought by higher elevation blower system into lower elevation while simultaneously lower elevation air is brought into higher elevation by lower elevation air blower system until there is a thermal equilibrium between higher and lower elevation or we reach pre-determined temperature.

For cooling, both higher and lower elevation fans assembly can interact with outside air for dropping temperature if outside temperature is lower than both lower and higher elevation temperatures. Then in this case both higher and lower elevation air is replaced by outside air. If higher elevation temperature is higher than outside temperature then higher elevation air is replaced by outside air. If both higher and lower elevation temperatures are lower than outside temperature then there is no air interaction with outside air. After the outside air exchange if any is done, then higher elevation air can be brought into lower elevation by higher elevation air blower while simultaneously lower elevation air is brought into higher elevation by lower elevation air blower until there is a thermal equilibrium between higher and lower elevation or we reach pre-determined temperature.

BRIEF DISCRIPTION OF THE DRAWINGS

Figure 1:
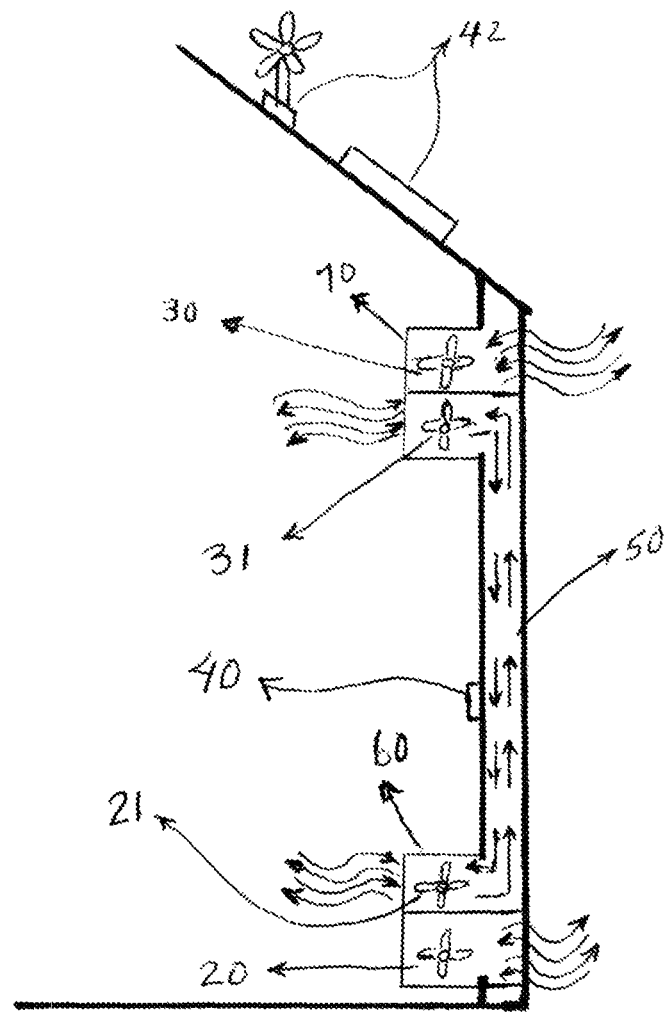
Figure 2:
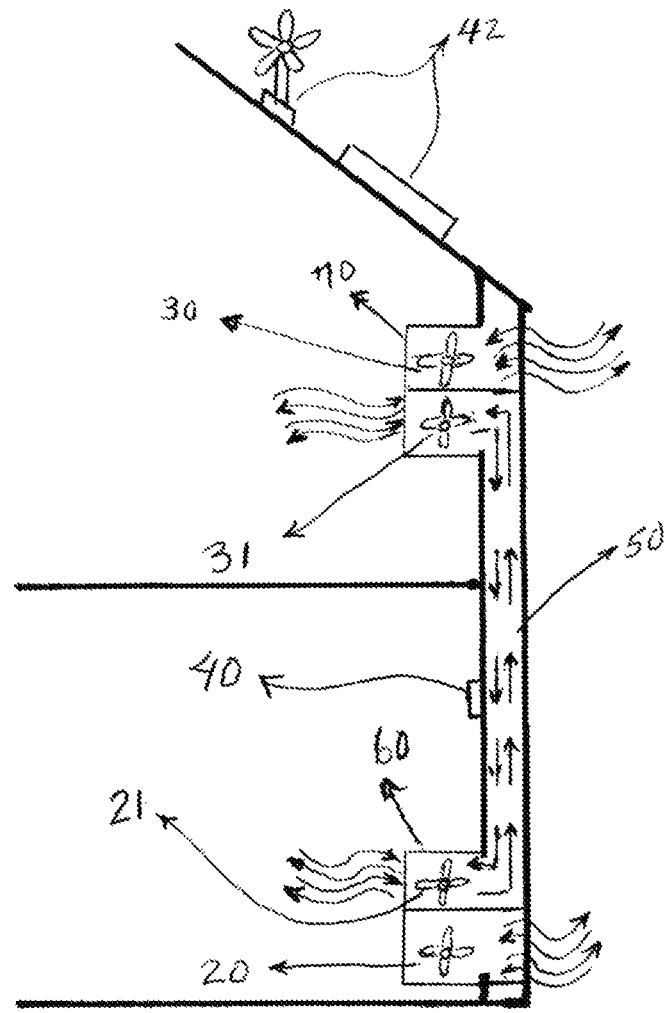
Figure 3:
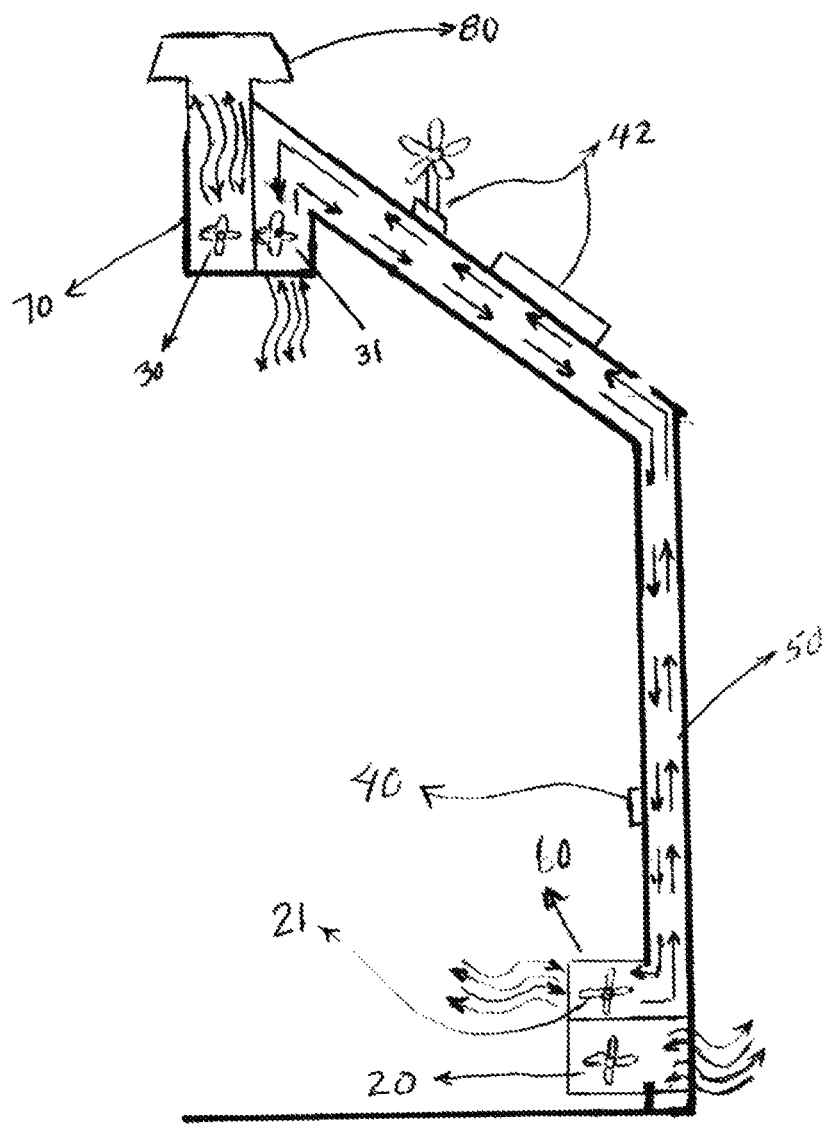
Figure 4:
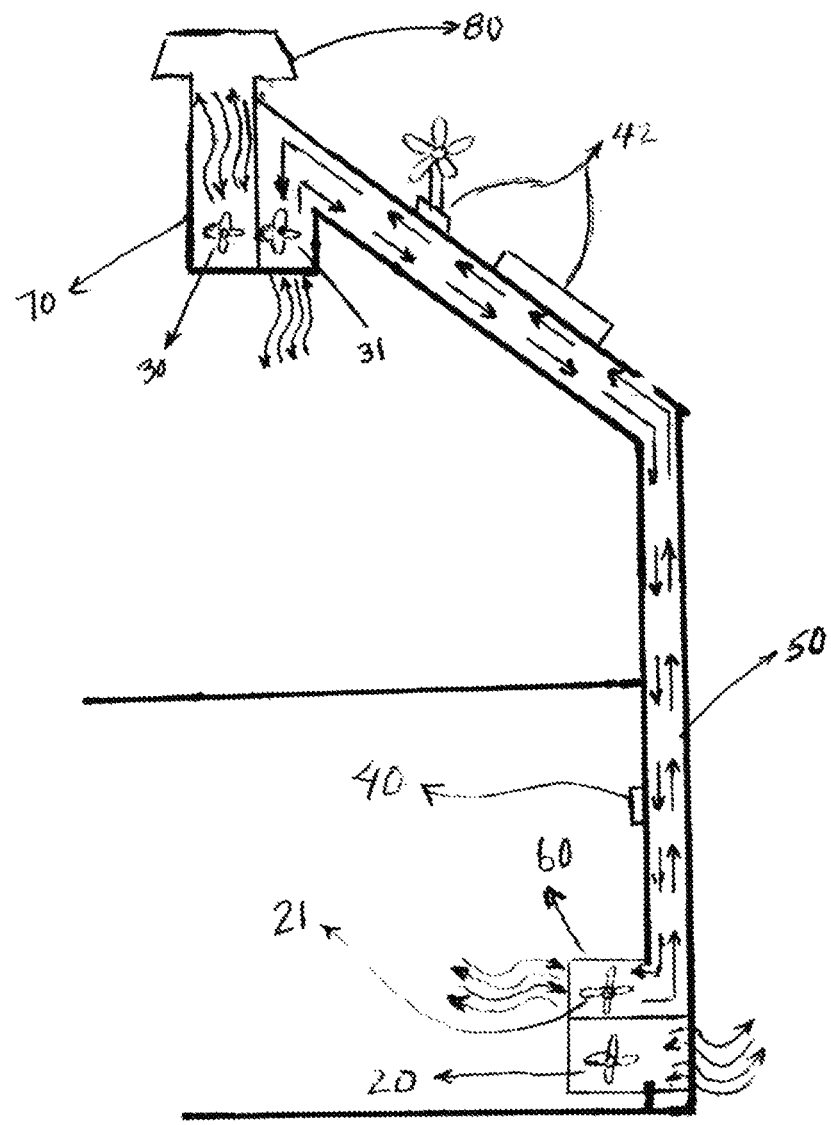

FIG. 1 is schematic for single level building.
FIG. 2 is schematic for multi level building
FIG. 3 is schematic for single level pitched roof
FIG. 4 is schematic for multi level pitched roof

DETAILED DESCRIPTION OF THE DRAWINGS

FIG. 1 present a green technology for heating and cooling. This green technology interact with outside air exchange system and lower elevation, higher elevation air exchange can adjust temperature to be always closer to thermal comfort. Lower elevation air blower 60 consist of lower elevation outside air blower 20 and lower elevation air blower 21. Higher elevation air blower 70 consist of higher elevation outside air blower 30 and higher elevation air blower 31. A control system 40 is provided. Control system 40 controls the operation of air blower 20, 21, 30, 31 controlling when they are on or off also which direction they rotate. Also control 40 has temperature sensor for both lower and higher elevation. All the air blower 20, 21, 30, 31 may be powered by solar panels (or wind turbine) 42. The air exchange between higher elevation and lower elevation happens by air blower 21 and 31 through the air channel (duct/ducts) 50.

The system compromises a higher elevation air blower 31 for moving air from higher elevation to lower elevation. Also air blower 30 to take out air from higher elevation or bring outside air to higher elevation zone. Also compromises a lower elevation air blower 21 for moving air from lower elevation to higher elevation also air blower 20 to take out air from lower elevation or bring outside air to lower elevation zone.

Referring to FIG. 2 is for multi level buildings

The higher level always should contain air at higher temperature than lower level. This difference in temperatures, and monopolization with outside temperature, and air exchange between higher and lower level can bring both levels to temperature equilibrium.

Referring to FIG. 3 is for pitched roof buildings

The air blower assembly 70 is located in highest for optimum high temperature.

Reffering to FIG. 4 is for pitched multi level buildings

What is claim is:

1. A system for regulating temperature between a higher elevation and a lower elevation of a single-story room of a building, the system comprising:
   a duct;
   a higher elevation air blower system for moving higher elevation air into the lower elevation or exchanging the higher elevation air with outside air from an exterior of the building; wherein the higher elevation air blower system comprises at least one higher elevation blower that blows air in different directions, wherein the at least one higher elevation blower is located in the duct; and
   a lower elevation air blower system for moving lower elevation air into the higher elevation or exchanging the lower elevation air with the exterior air from outside the building; wherein the lower elevation air blower system comprises at least one lower elevation blower that blows air in different directions, wherein the at least one lower elevation blower is located in the duct;
   wherein the higher elevation blower system and the lower elevation blower system are powered by renewable energy generated from solar panels or a wind turbine;
   wherein the higher elevation air blower system and the lower elevation air blower system are operated to regulate the temperature such that:
   (i) the lower elevation air blower system blows the lower elevation air to the exterior of the building or draws the outdoor air into the lower elevation; and
   (ii) the higher elevation air blower system blows the higher elevation air to the exterior of the building or draws the outdoor air into the higher elevation; and
   (iii) the higher elevation air blower system moves the higher elevation air into the lower elevation simultaneously as the lower elevation air blower system moves the lower elevation air into the higher elevation.

2. The system of claim 1, wherein the at least one higher elevation blower comprises a reversible first blower located in the duct for blowing the air in either direction between the higher elevation and the lower elevation.

3. The system of claim 2, wherein the at least one higher elevation blower further comprises a second reversible blower located in the duct for blowing the higher elevation air to the exterior of the building or drawing the outdoor air into the higher elevation.

4. The system of claim 1, wherein the at least one lower elevation blower comprises a reversible first blower located in the duct for blowing the air in either direction between the lower elevation and the higher elevation.

5. The system of claim 4, wherein the at least one lower elevation blower further comprises a second reversible blower located in the duct for blowing the lower elevation air to the exterior of the building or drawing the outdoor air into the lower elevation.

6. The system of claim 1, wherein when the system is heating, the higher elevation air blower system and the lower elevation air blower system are operated to regulate the temperature such that:
 (i) if an outside air temperature is higher than a higher elevation air temperature, the higher elevation air blower system replaces the higher elevation air with the outside air until a pre-determined temperature is reached;
 (ii) if the outside air temperature is higher than a lower elevation air, the lower elevation air blower system replaces the lower elevation air with the outside air until the pre-determined temperature is reached;
 (iii) if the outside air temperature is lower than the higher elevation air temperature and the lower elevation air temperature, the higher elevation air blower system and the lower elevation air blower system do not replace the higher elevation air and the lower elevation air with the outside air; and
 (iv) after steps (i), (ii), and (iii), the higher elevation air blower system moves the higher elevation air into the lower elevation simultaneously as the lower elevation air blower system moves the lower elevation air into the higher elevation until a thermal equilibrium between the higher elevation air temperature and the lower elevation air temperature is reached.

7. The system of claim 1, wherein when the system is cooling, the higher elevation air blower system and the lower elevation air blower system are operated to regulate the temperature such that:
 (i) if an outside air temperature is lower than a higher elevation air temperature, the higher elevation air blower system replaces the higher elevation air with the outside air until a pre-determined temperature is reached;
 (ii) if the outside air temperature is lower than a lower elevation air, the lower elevation air blower system replaces the lower elevation air with the outside air until the pre-determined temperature is reached;
 (iii) if the outside air temperature is higher than the higher elevation air temperature and the lower elevation air temperature, the higher elevation air blower system and the lower elevation air blower system do not replace the higher elevation air and the lower elevation air with the outside air; and
 (iv) after steps (i), (ii), and (iii), the higher elevation air blower system moves the higher elevation air into the lower elevation simultaneously as the lower elevation air blower system moves the lower elevation air into the higher elevation until a thermal equilibrium between the higher elevation air temperature and the lower elevation air temperature is reached.

8. The system of claim 1, wherein the solar panels or the wind turbine includes a rechargeable power backup for continuous operation of the system.

\* \* \* \* \*